United States Patent
Lesso et al.

(10) Patent No.: US 11,468,899 B2
(45) Date of Patent: Oct. 11, 2022

(54) ENROLLMENT IN SPEAKER RECOGNITION SYSTEM

(71) Applicant: Cirrus Logic International Semiconductor Ltd., Edinburgh (GB)

(72) Inventors: John Paul Lesso, Edinburgh (GB); Ben Hopson, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 132 days.

(21) Appl. No.: 16/188,629

(22) Filed: Nov. 13, 2018

(65) Prior Publication Data

US 2019/0147886 A1    May 16, 2019

Related U.S. Application Data

(60) Provisional application No. 62/585,627, filed on Nov. 14, 2017.

(30) Foreign Application Priority Data

Feb. 13, 2018  (GB) ..................... 1802309

(51) Int. Cl.
*G10L 17/04* (2013.01)
*G06K 9/62* (2022.01)
*G10L 17/22* (2013.01)
*G10L 17/08* (2013.01)
*G10L 17/16* (2013.01)

(52) U.S. Cl.
CPC ............ *G10L 17/04* (2013.01); *G06K 9/6215* (2013.01); *G10L 17/08* (2013.01); *G10L 17/22* (2013.01); *G10L 17/16* (2013.01)

(58) Field of Classification Search
CPC ......... G10L 17/04; G10L 17/22; G10L 17/02; G10L 17/06; G10L 17/20; G10L 17/005; G10L 17/08; G10L 17/12
See application file for complete search history.

(56) References Cited

U.S. PATENT DOCUMENTS

| | | | |
|---|---|---|---|
| 9,697,836 B1 * | 7/2017 | Lousky | H04L 63/0861 |
| 2006/0222210 A1 | 10/2006 | Sundaram | |
| 2010/0076770 A1 | 3/2010 | Ramasawamy | |
| 2010/0158207 A1 * | 6/2010 | Dhawan | G10L 17/22 |
| | | | 379/88.02 |
| 2011/0224986 A1 * | 9/2011 | Summerfield | G10L 17/12 |
| | | | 704/246 |
| 2013/0225128 A1 * | 8/2013 | Gomar | G10L 17/22 |
| | | | 455/411 |

(Continued)

FOREIGN PATENT DOCUMENTS

WO    01/24163 A1    4/2001

OTHER PUBLICATIONS

Combined Search and Examination Report under Sections 17 and 18(3), UKIPO, Application No. 1802309.3, dated Jul. 30, 2018.

(Continued)

*Primary Examiner* — Mark Villena
(74) *Attorney, Agent, or Firm* — Jackson Walker L.L.P.

(57) ABSTRACT

A method of enrolling a user in a speaker recognition system comprises receiving a sample of the user's speech. A trial voice print is generated from the sample of the user's speech. A score is obtained relating to the trial voice print. The user is enrolled on the basis of the trial voice print only if the score meets a predetermined criterion.

16 Claims, 4 Drawing Sheets

(56) References Cited

U.S. PATENT DOCUMENTS

| | | | |
|---|---|---|---|
| 2013/0253931 A1* | 9/2013 | Shen | G10L 17/04 704/243 |
| 2015/0067822 A1* | 3/2015 | Randall | G06F 21/32 726/17 |
| 2015/0249664 A1* | 9/2015 | Talhami | H04L 63/0861 726/6 |
| 2015/0301796 A1* | 10/2015 | Visser | G10L 15/22 715/728 |
| 2016/0217793 A1* | 7/2016 | Gorodetski | G10L 17/04 |
| 2017/0061968 A1* | 3/2017 | Dalmasso | G10L 17/08 |
| 2017/0125036 A1* | 5/2017 | Wang | G10L 17/22 |
| 2017/0194004 A1 | 7/2017 | Lousky et al. | |
| 2018/0233140 A1* | 8/2018 | Koishida | G06F 40/35 |
| 2018/0240463 A1* | 8/2018 | Perotti | G10L 17/08 |
| 2018/0293988 A1* | 10/2018 | Huang | G10L 17/20 |

OTHER PUBLICATIONS

International Search Report and Written Opinion of the International Searching Authority, International Application No. PCT/GB2018/053273, dated Feb. 11, 2019.

\* cited by examiner

ENROLLMENT IN SPEAKER RECOGNITION SYSTEM

TECHNICAL FIELD

Embodiments described herein relate to a speaker recognition system.

BACKGROUND

Speaker recognition systems are becoming widely used. In such systems, a user enrolls by providing a sample of their speech, and this is used to form a model of the speech, also known as a voice print. Then, during subsequent speaker recognition attempts, samples of speech are compared with the model.

It is possible to classify users into categories in a "biometric zoo", indicating (a) whether the system easily recognises their subsequent speech inputs as matching their enrolled sample, and (b) whether the system erroneously recognises other people's speech samples as theirs.

SUMMARY

It is now recognised that some false acceptances and false rejections of users in a speaker recognition system can be avoided by allowing a user to enroll only if the speech sample that they provide allows a strong voice print to be generated.

According to an aspect of the present invention, there is provided a method of enrolling a user in a speaker recognition system, the method comprising:
  receiving a sample of the user's speech;
  generating a trial voice print from the sample of the user's speech;
  obtaining a score relating to the trial voice print; and
  enrolling the user on the basis of the trial voice print only if the score meets a predetermined criterion.

In some embodiments, obtaining the score relating to the trial voice print comprises:
  obtaining a score, indicating a degree of similarity between the trial voice print and other voice prints or speech samples; and
  enrolling the user on the basis of the trial voice print only if the score meets a predetermined criterion.

In that case, obtaining a score may comprise obtaining a first score, indicating a degree of similarity between previously stored voice prints or speech samples of other speakers and the trial voice print, and the method may comprise:
  enrolling the user on the basis of the trial voice print only if the first score is below a first threshold.

The first threshold may then correspond to a predetermined false acceptance rate.

The method may further comprise:
  if the score exceeds the first threshold, requesting the user to provide a second sample of their speech and generating a new trial voice print therefrom.

The method may further comprise:
  if the score exceeds the first threshold, generating a new trial voice print from the received sample of the user's speech.

The method may comprise:
  obtaining a plurality of scores, each of said scores indicating a respective degree of similarity between a respective previously stored voice print or speech sample of another speaker and the trial voice print;
  determining which of the plurality of scores is a minimum; and
  taking the minimum of the plurality of scores as the first score.

The method may comprise:
  obtaining a plurality of scores, each of said scores indicating a respective degree of similarity between a respective previously stored voice print or speech sample of another speaker and the trial voice print;
  determining a mean of the plurality of scores; and
  taking the mean of the plurality of scores as the first score.

In some embodiments, the first score may indicate a degree of similarity between previously stored voice prints or speech samples of a selected cohort of other speakers, and the method may comprise:
  determining which of a plurality of cohorts of other speakers is closest to the trial voice print, and using said closest cohort as the selected cohort in obtaining the first score.

The method may comprise generating the trial voice print from at least one section of the sample of the user's speech,
  wherein obtaining a score comprises obtaining a second score, indicating a degree of similarity between at least one other section of the sample of the user's speech and the trial voice print, and
  wherein the method comprises:
  enrolling the user on the basis of the trial voice print only if the second score is above a second threshold.

In that case, the second threshold may correspond to a predetermined false rejection rate.

The method may further comprise:
  if the score does not exceed the second threshold, requesting the user to provide a second sample of their speech and generating a new trial voice print therefrom.

The method may further comprise:
  if the score does not exceed the second threshold, generating a new trial voice print from the received sample of the user's speech.

In some embodiments, the method comprises:
  receiving the sample of the user's speech;
  dividing the sample of the user's speech into a plurality of sections; and
  obtaining the trial voice print based on a subset of the plurality of sections.

In that case, the step of selecting one of the utterances may comprise:
  obtaining a second voice print based on all of said plurality of sections;
  for each of the plurality of sections, obtaining a respective score representing a similarity between the respective section and the second voice print;
  identifying the one of said sections having the lowest similarity with the second voice print; and
  obtaining the trial voice print based on the plurality of sections excluding the identified one of said sections.

Further, the method may comprise repeating the steps of obtaining a second voice print; obtaining a respective score representing a similarity between the respective section and the second voice print; and identifying the one of said sections having the lowest similarity with the second voice print, before obtaining the trial voice print.

The step of selecting one of the utterances may comprise:
  obtaining a plurality of second voice prints, each second voice print being based on the plurality of utterances excluding a respective one of said utterances;
  for each of the plurality of utterances, obtaining a respective score representing a similarity between the respective utterance and the respective second voice print based on the plurality of utterances excluding that respective one of said utterances;

identifying the one of said utterances having the lowest similarity with the respective second voice print; and using the second voice print based on the plurality of utterances excluding the identified one of said utterances as the trial voice print.

In some embodiments, a score representing a similarity between speech and a voice print is obtained by:

training an utterance voice print from the speech; and comparing the utterance voice print against said voice print.

In that case, the trial voice print and the utterance voice print are each provided as a vector, and the step of comparing the trial voice print and the utterance voice print is performed by comparing the vectors.

For example, the trial voice print and the utterance voice print may each be provided as a Gaussian Mixture Model (GMM) or Hidden Markov Model (HMM) vector. The step of comparing the utterance voice print against the trial voice print may then comprise comparing a stacked vector of Gaussian means between the utterance voice print and the trial voice print.

The method may comprise comparing the vectors using a sum-of-squares, a root-of-mean-of-squares, or a distance metric. For example, the distance metric may comprise a Mahalanobis-distance, an ANOVA determination, a Kullback-Leibler divergence, a Bhattacharyya distance, a Hellinger distance, a Jensen-Shannon divergence, or a Fischer distance.

The method may comprise comparing the utterance voice print against said voice print by:

projecting the utterance voice print against said voice print into a lower-dimensional subspace; and performing the comparison on the projections of their stacked vectors.

The method may comprise performing the comparison on the vector projections of their vectors using cosine similarity.

The method may comprise performing the comparison on the vector projections of their vectors using a scalar product.

In some embodiments, a score representing a similarity between speech and a voice print is obtained by:

directly scoring the speech against the voice print by treating the speech as if it were test speech in a speaker verification system using the voice print.

The method may further comprise:

applying normalization to the score representing the similarity between the utterance and the voice print utterance-model, using an additional set of non-target models as a cohort.

According to another aspect of the present invention, there is provided a system for enrolling a user in a speaker recognition system, configured for operating in accordance with the method.

According to another aspect of the present invention, there is provided a device comprising such a system. The device may comprise a mobile telephone, an audio player, a video player, a mobile computing platform, a games device, a remote controller device, a toy, a machine, or a home automation controller or a domestic appliance.

According to another aspect of the present invention, there is provided a computer program product, comprising a computer-readable tangible medium, and instructions for performing a method according to the first aspect.

According to another aspect of the present invention, there is provided a non-transitory computer readable storage medium having computer-executable instructions stored thereon that, when executed by processor circuitry, cause the processor circuitry to perform a method according to the first aspect.

According to another aspect of the present invention, there is provided a device comprising the non-transitory computer readable storage medium. The device may comprise a mobile telephone, an audio player, a video player, a mobile computing platform, a games device, a remote controller device, a toy, a machine, or a home automation controller or a domestic appliance.

According to a further aspect of the invention, there is provided a method of enrolling a user in a speaker recognition system, the method comprising:

receiving a sample of the enrolling user's speech; and generating an enrollment voice print from the sample of the enrolling user's speech;

and the method further comprising:

from a plurality of previously stored voice prints of other speakers, defining a plurality of cohorts of said other speakers;

comparing the enrollment voice print with each of said plurality of cohorts of said other speakers;

determining which of said plurality of cohorts of said other speakers is closest to the enrollment voice print; and identifying said closest cohort in the enrollment process.

The step of determining which of said plurality of cohorts of said other speakers is closest to the enrollment voice print may comprise determining which of said plurality of cohorts of said other speakers has a mean that is closest to the enrollment voice print.

According to a further aspect of the invention, there is provided a method of speaker recognition, comprising:

enrolling a user by means of such a method;

receiving a sample of speech of a speaker to be recognised;

generating an access voice print from the sample of the speech of the speaker to be recognised; and determining from the access voice print, the enrollment voice print, and the identified closest cohort, whether the speaker to be recognised is the enrolled user.

BRIEF DESCRIPTION OF DRAWINGS

For a better understanding of the present invention, and to show how it may be put into effect, reference will now be made to the accompanying drawings, in which.

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The methods described herein can be implemented in a wide range of devices and systems, for example a mobile telephone, an audio player, a video player, a mobile computing platform, a games device, a remote controller device, a toy, a machine, or a home automation controller or a domestic appliance. However, for ease of explanation of one embodiment, an illustrative example will be described, in which the implementation occurs in a smartphone.

Figure 1:
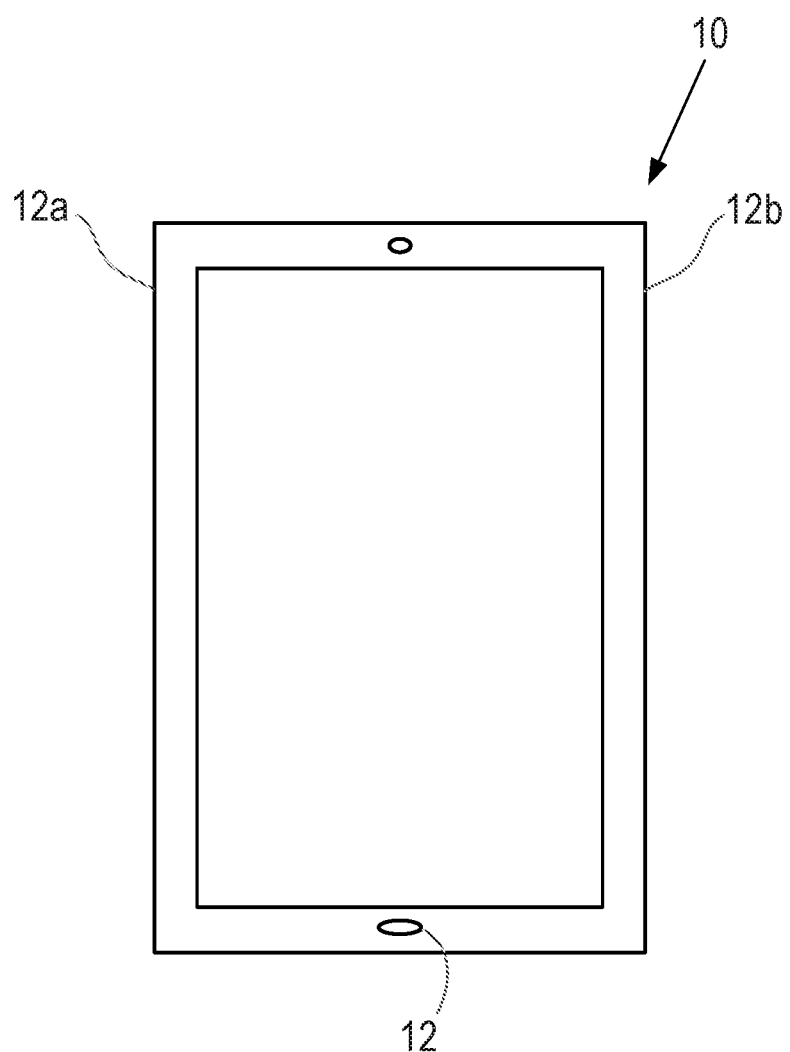
FIG. 1 illustrates a smartphone.

FIG. 1 illustrates a smartphone 10, having a microphone 12 for detecting ambient sounds. In normal use, the microphone is of course used for detecting the speech of a user who is holding the smartphone 10 close to their face.

Figure 2:
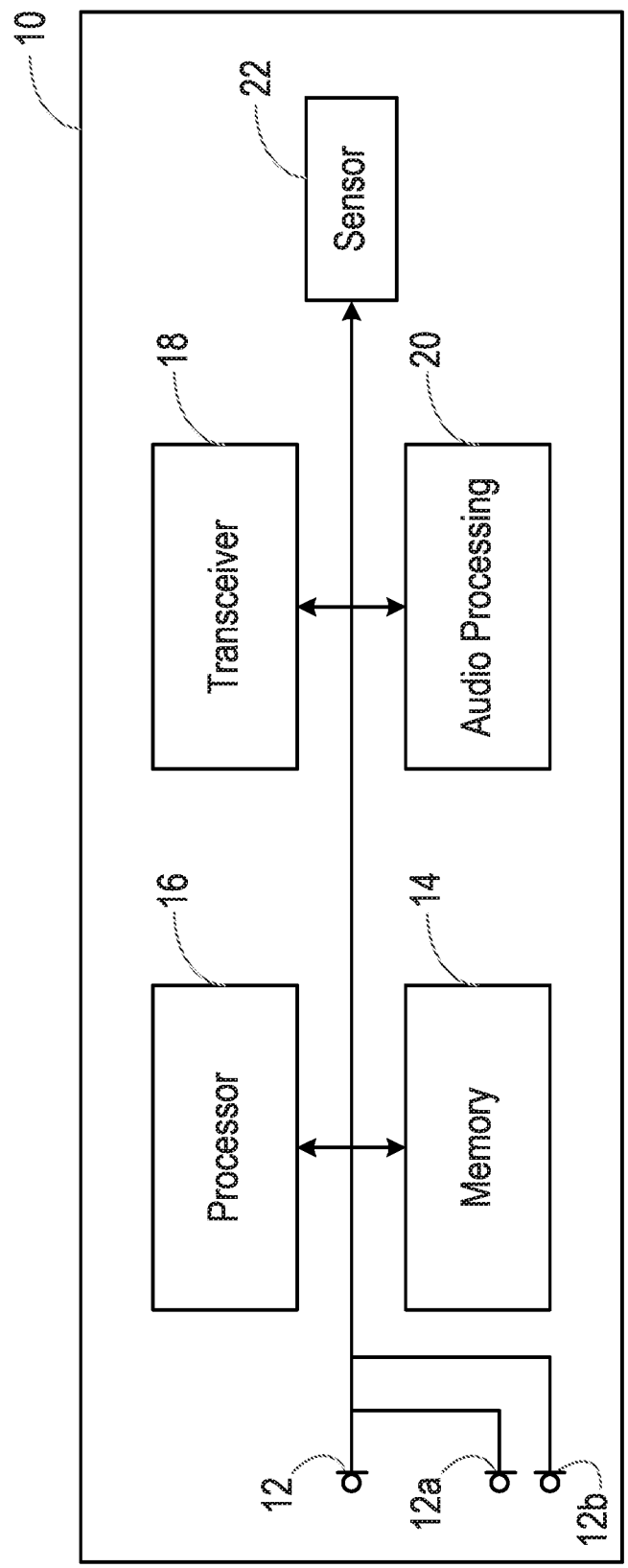
FIG. 2 is a schematic diagram, illustrating the form of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In certain embodiments, the smartphone 10 is provided with multiple microphones 12, 12a, 12b, etc.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

In this embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device.

In other embodiments, the speech recognition is also performed on the smartphone 10.

Embodiments of the invention may be used in a variety of audio processing systems, including speech processing systems. Described below are embodiments for use in a speaker recognition system.

Figure 3:
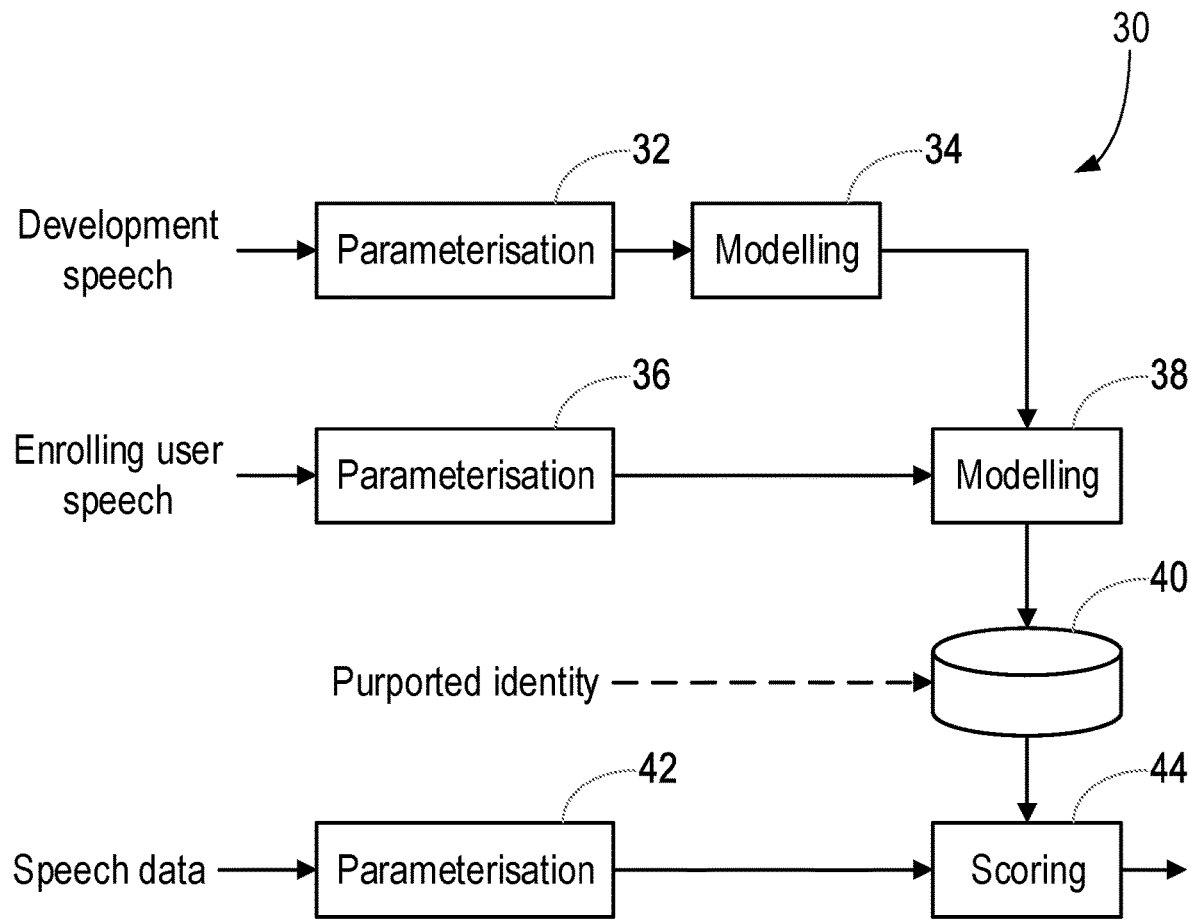
FIG. 3 illustrates a speech processing system.

FIG. 3 is a block diagram illustrating the basic form of a speaker recognition system.

A typical speaker recognition system 30 uses a background model, for example a Universal Background Model (UBM), that is based on the speech of a large number of people. This speech, referred to as development speech, is passed to a parametrisation block 32, in which features of the speech are obtained.

These features are passed to a modelling block 34, which forms a background model.

When a user wishes to enroll in the speaker recognition system, they speak into a microphone, and the speech of the enrolling user is passed to a second parametrisation block 36, in which features of the speech are obtained. The second parametrisation block 36 may obtain the same features as the parametrisation block 32.

The features obtained by the second parametrisation block 36 are passed to a second modelling block 38, which forms a model of the user's speech, also referred to as a voice print. This takes account of the background model formed by the modelling block 34, so that the model of the user's speech contains features that help to distinguish that user from other speakers.

The model of the enrolling user's speech, formed by the modelling block 38, is stored in a database 40.

The speaker recognition system 30 may be used for speaker identification and/or speaker verification.

In the case of speaker verification, a speaker provides an indication of their identity as an enrolled user, either explicitly or implicitly. This is used to select the model of that enrolled user's speech.

Speech data from that speaker is passed to a third parametrisation block 42, in which features of the speech are obtained. The third parametrisation block 42 may obtain the same features as the parametrisation block 32.

The features obtained by the third parametrisation block 42 are passed to a scoring block 44. The scoring block 44 compares the features obtained by the third parametrisation block 42 with the model of the purported speaker's speech, and determines whether the similarity is enough to conclude, to a degree of certainty that is appropriate to the required level of security of the system, that the speaker is indeed who they claim to be.

In the case of speaker identification, there is no indication of the identity of a speaker.

Speech data from the speaker is again passed to the third parametrisation block 42, in which features of the speech are obtained.

The features obtained by the third parametrisation block 42 are passed to the scoring block 44. In this case, the scoring block 44 compares the features obtained by the third parametrisation block 42 with the models of each enrolled speaker's speech, and determines which of those enrolled speakers is most likely to have been the speaker.

Where the speaker recognition system 30 is intended to be used in a device such as the smartphone 10, or any other consumer device, it is likely that the parametrisation block 32 and the modelling block 34 will not be provided in the smartphone 10, which will instead be provided with the background model.

In the case of a smartphone, home automation controller or the like, the speaker recognition system may rely on the user speaking a predetermined trigger phrase, such as "Hello phone", to wake up the system. In that case, the user may be requested to speak that phrase when enrolling. Further, the verification system may be activated only when a trigger phrase detection module determines that the predetermined trigger phrase has been spoken.

Figure 4:
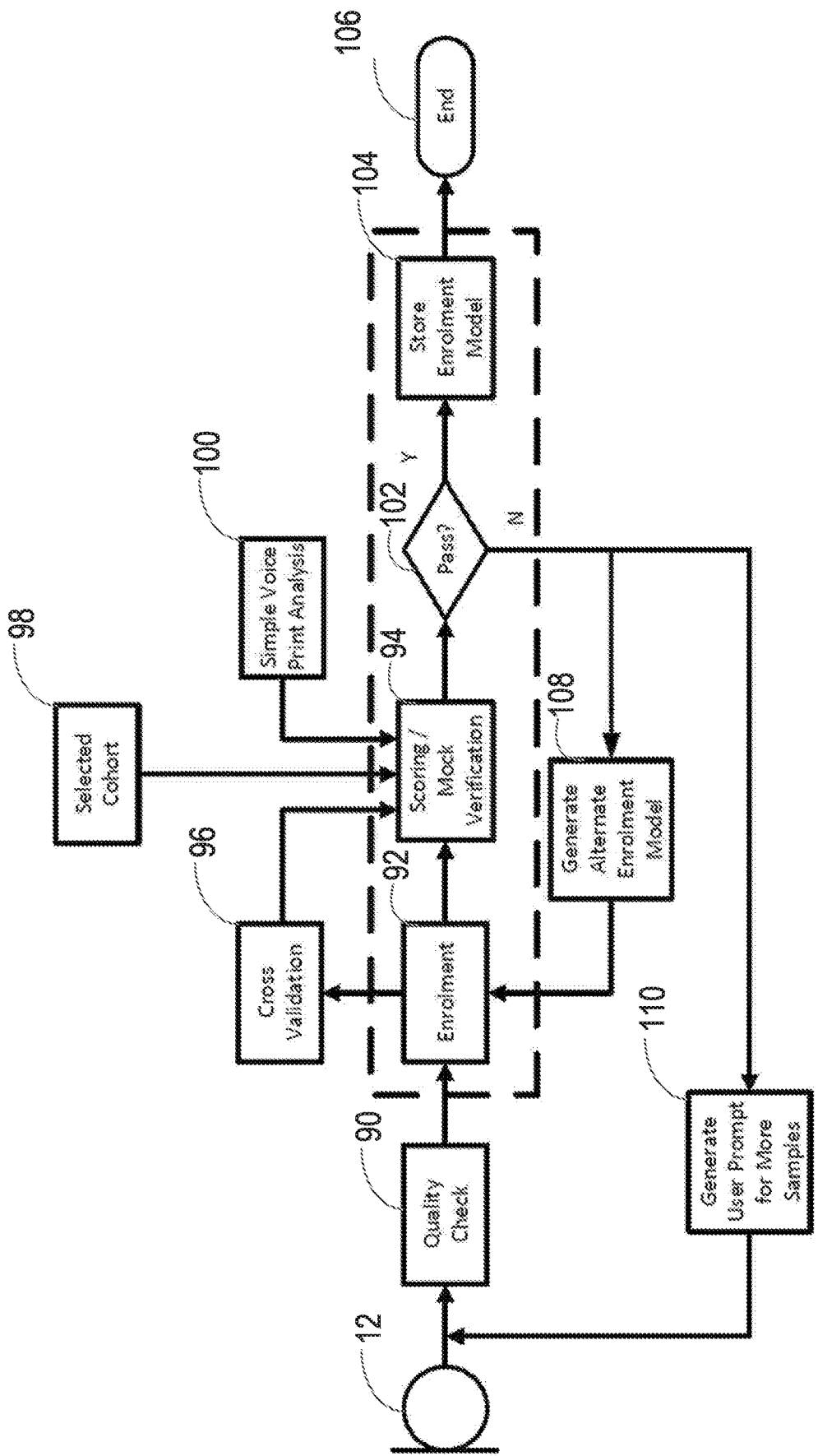
FIG. 4 illustrates a method of enrolling a user in a speaker recognition system.

FIG. 4 is a flow chart block diagram, illustrating a method of enrollment in accordance with an embodiment as described herein. The aim of enrollment is to produce a strong voice print, that is, a voice print, or a model of the user's speech, that can be used in subsequent verification with a high probability that the user's speech input during the verification will be correctly matched with the model (i.e. that there will be low False Rejection Rate (FRR)), and with a low probability that other speakers will be incorrectly matched with the model (i.e. that there will be a low False Acceptance Rate (FAR)).

FIG. 4 shows a microphone 12, for generating an audio signal in response to detected sounds. As is known, the audio signal may be passed to a voice activity detector so that only parts of the audio signal that contain speech are processed further. The process illustrated in FIG. 4 may be activated only when signals containing speech are detected, in response to an indication from a user that they intend to enroll in the speaker recognition system.

The audio signal may therefore contain the speech of the user in response to a prompt from the system. The speech may contain a specific phrase requested by the system, for example a predetermined trigger phrase as discussed above. Alternatively, in a text-independent system, the content of the speech may not be known in advance.

The audio signal containing the speech is passed to a quality check block 90. This tests whether the received audio signal meets quality criteria that are intended to determine whether the signal is likely to give rise to a strong voice print. For example, the quality check block 90 may determine the signal-to-noise ratio (SNR) of the signal, and may reject the signal if the SNR is below a threshold. As another example, the quality check block 90 may attempt to detect clipping of audio in the signal, and may reject the signal if clipping is detected. In other examples, other characteristics of the signal are tested. If the audio signal is rejected, the user may be prompted to provide a new voice sample, for example with guidance as to what caused the rejection.

This test as to whether the received audio signal meets the quality criteria can prevent unsuitable signals from being used in the enrollment. However, even when the audio signal meets the quality criteria, this is not enough to be sure that the received signal will produce a strong voice print.

Assuming that the quality criteria applied by the quality check block 90 are met, the received audio signal is passed to an enrollment block 92, in which a trial voice print is generated. In alternative embodiments, the audio signal is assessed against the quality criteria mentioned above, and this score is combined with the score that is given to the trial voice print, as described in more detail below, in order to determine whether the audio signal is a sufficient basis for enrollment.

Techniques for extracting features of a user's speech from an audio signal, and for forming a voice print, or a model of the user's speech, are well known.

In some embodiments, a trial voice print is formed from all of the user's speech in the audio signal.

In other embodiments, a trial voice print is formed from only a part of the user's speech in the audio signal.

As one example of this, the user's speech may be divided into multiple sections. For example, in a text-independent system, the speech may be divided into sections of equal length. In a text-dependent system, the user may be requested to say the trigger phrase several times, and each repetition of the trigger phrase may be taken as one of the sections of the speech. After dividing the speech into sections, the trial voice print may be formed from a subset of the sections.

The trial voice print is passed to block 94, in which a scoring process is performed, for obtaining a score relating to the trial voice print. This scoring process relates to a statistical scoring or analysis of the generated trial voice print itself, and/or a scoring in a mock verification of the generated trial voice print for target or non-target scores (that is, for scores relative to the same user's own speech, or other speakers' speech, respectively).

In some embodiments, the score indicates a degree of similarity between the trial voice print and other speech samples.

For example, the scoring process may compare the trial voice print with other speech samples obtained from the same user. In one embodiment, the user's speech is divided into multiple sections, as described above, with the trial voice print being formed from a subset of the sections. In that case, the cross validation block 96 extracts the remaining sections from the user's speech, and supplies these remaining sections to the scoring block 94, for comparison with the trial voice print.

Each comparison may give rise to a score, which can be taken as a measure of the similarity between the respective sample and the trial voice print. The intention is to confirm whether the trial voice print is such that there is a low probability that a sample of the user's speech input during the verification will not be found to be correctly matched with the model (i.e. that there will be low False Rejection Rate (FRR)). The test for this can be, for example, that the mean value of the scores obtained from each of the other samples of the user's speech should be above a threshold value. Alternatively, the test may be that the minimum value of the scores obtained from each of the other samples of the user's speech should be above a threshold value.

While it is advantageous that the scores obtained when comparing the speech from other speakers against the trial voice print should be high, implying a low False Rejection Rate, an excessively high score may suggest that the trial voice print is overfitted against the available data. To guard against this, the minimum value of the scores obtained from each of the other samples of the user's speech may also be compared with a second threshold value that is higher than the previously mentioned threshold value. If the scores are higher than this second threshold value (for example, when the scores are expressed as a probability of a match, then the second threshold value may be set at a probability of 95%, or 99%, or 99.9%), then the trial voice print may be rejected as being possibly overfitted.

In addition, a further test may be applied, to check that the spread of the scores is not excessive, when comparing the trial voice print with other speech samples obtained from the same user. That is, if a user's speech is too variable (for example if the user speaks at different speeds, pitches, intonations, etc), this will not be a good basis for enrollment, and the system may decide that the user should not be enrolled on the basis of that speech. One way of determining that the spread of the scores is not excessive is to examine the Coefficient of Variation. Thus, multiple speech samples from the enrolling user are compared with the trial voice print, to obtain multiple scores. Then, the mean ($\mu$) and standard deviation ($\sigma$) of these multiple scores are calculated. The Coefficient of Variation (Cv) can then be calculated as Cv=($\sigma/\mu$). A low value of the Coefficient of Variation will indicate that the scores are relatively consistent, and hence that the enrollment is acceptable.

Additionally, or alternatively, the scoring process may compare the trial voice print with speech samples obtained from other speakers. In this case, speech samples from a selected cohort 98 of other speakers are compared with the trial voice print in the scoring block 94. The speech samples from the selected cohort (or voice prints derived from that cohort) may be stored in the device 10 itself, or may be stored remotely and accessible over a network connection.

Again, each comparison may give rise to a score, which can be taken as a measure of the similarity between the respective sample and the trial voice print. The intention in this case is to confirm whether the trial voice print is such that there is a low probability that a speech sample from another speaker will be found to be matched with the model (i.e. that there will be low False Acceptance Rate (FAR)). The test for this can be, for example, that the maximum value of the scores obtained from each of the speech samples of the other speakers should be below a threshold value.

While it is advantageous that the scores obtained when comparing the speech from other speakers against the trial voice print should be low, implying a low False Acceptance Rate, an excessively low score may suggest that the trial voice print is overfitted against the available data. To guard against this, the maximum value of the scores obtained from each of the speech samples of the other speakers may also be compared with a second threshold value that is lower than the previously mentioned threshold value. If the scores are lower than this second threshold value, then the trial voice print may be rejected as being possibly overfitted.

In the case of a comparison between the trial voice print and a cohort of other speakers, there may be multiple possible cohorts available, with just one of these cohorts being selected by the cohort selection 98. In this case, once the trial voice print is generated, it is compared against the set of stored cohorts. This comparison is performed to find the cohort that is most similar to the trial voice print. For example, after performing a statistical comparison between the trial voice print and the different cohorts, the most similar cohort may be considered to be the one which has the closest to a Mean=0 and Standard Deviation=1 from the trial voice print.

The selection of the closest cohort means that, when the selected cohort is compared with the trial voice print to generate the non-target scores, these scores will provide the best possible test as to whether the trial voice print will in practice meet the desired low False Acceptance Rate.

Testing the trial voice print against the speech samples of other users, and against other speech samples of that same user, allows a determination as to where that voice print would be classified in a "biometric zoo".

A further test of the trial voice print can be described as "identity scoring". After forming a trial voice print, based on a particular sample of the user's speech, a test is run, in which that same sample of the user's speech is treated as a sample presented for verification, and is scored against the trial voice print. Clearly, this sample should result in a very high score, and so this can be used as a test because, if the result is not a very high score, this suggests that the process of forming the trial voice print has failed in some way, and hence that the trial voice print should be rejected.

Additionally, or alternatively, the scoring process may analyse the trial voice print against other criteria, as shown in block 100. For example, statistics may be obtained from the trial voice print, and compared with predetermined thresholds.

Based on the score or scores obtained from the scoring block 94, it is determined at step 102 whether the voice print is a strong voice print. When one score is obtained, it may be determined whether this score meets a predetermined criterion. When multiple scores are obtained, they may be combined to form a composite score, and it may be determined whether that composite score meets a predetermined criterion. Alternatively, the multiple scores may be separately compared with respective predetermined thresholds, and it may be determined whether each of them meets their respective criteria.

If it is determined at step 102 that the trial voice print meets the criterion or criteria for a strong voice print, the process passes to step 104, in which the trial voice print is stored as the enrolled speaker voice print or speaker model. The enrollment process then ends at step 106, and the model can be used in subsequent speaker recognition attempts, in which that user is the purported user or is one of several possible speakers. Thus, the user is enrolled on the basis of the trial voice print (that is, the user is enrolled into the system, and the trial voice print is used for subsequent verification and/or identification attempts), only if the score meets a predetermined criterion.

However, if it is determined at step 102 that the trial voice print does not meet the criterion or criteria for a strong voice print, the process may pass to step 108, in which an alternate enrollment model is generated, and this is used as a trial voice print. For example, when the user's speech is divided into multiple sections, and the trial voice print was formed from a subset of those sections, the alternate enrollment model may be a new trial voice print, generated from a different subset of the sections of the user's speech. In principle, many or all different subsets can be considered, and tested, with the subset that generates the best scores when tested against the other samples of the user's speech and against the cohort of other speakers being selected as the voice print that is used for enrollment.

Alternatively, if it is determined at step 102 that the trial voice print does not meet the criterion or criteria for a strong voice print, the process may pass to step 110, in which the user is prompted to speak again, in order to generate a new audio signal that can be used as a new input to the enrollment process.

As described above, in the enrollment block 92, a trial voice print (or speaker model) is generated. As also mentioned above, the user's speech may be divided into multiple sections, and the trial voice print may be formed from a subset of the sections. More specifically, each section of the speech may be represented as a set of audio features, and these features may be used to form the trial voice print.

A first method of forming the trial voice print from a subset of the sections is to select a predetermined subset of the sections. For example, if the speech is divided into ten sections, five of these may be used to form the trial voice print.

A second method of forming the trial voice print from a subset of the sections is to form an intermediate trial voice print using all of the available sections of the speech or all members of one subset of the sections. Then, each section of the speech is scored against that intermediate trial voice print. That is, the section of the speech is compared in turn with the intermediate trial voice print to obtain a score. The section that has the lowest score is the least consistent with the intermediate trial voice print. This section may then be excluded from the set, and a new voice print formed from the remaining members of the set. This new voice print can then be used as the trial voice print in the subsequent steps of the method illustrated in FIG. 4.

If desired, this process may be repeated for a number of iterations, with the new voice print being used as a new intermediate trial voice print, with all remaining sections of the speech being compared against that new intermediate trial voice print. For example, this may be repeated for up to N/2 iterations where N is the total number of sections of the speech, although it is of course possible to form the trial voice print based on a single section of the speech.

A third method of forming the trial voice print from a subset of the sections is to form multiple intermediate trial voice prints, each excluding one section of the speech out of a group that may contain all of the available sections, or may itself be a subset of those sections. Each of the sections in that group is then scored against the respective one of the multiple intermediate trial voice prints that excluded that one section of the speech.

The section of the speech that has the lowest score is found, and the intermediate trial voice print that excluded that one section of the speech is taken as the trial voice print in the subsequent steps of the method illustrated in FIG. 4.

If desired, this process may be repeated for a number of iterations, with one section of the speech being excluded in each iteration. For example, this may be repeated for up to N/2 iterations where N is the total number of sections of the speech, although it is of course possible to form the trial voice print based on a single section of the speech.

In connection with the scoring block 94, and in connection with the second and third methods of forming the trial voice print from a subset of the sections, reference has been made to comparing a section of speech with a voice print, that is, scoring the section of speech against the voice print.

It was mentioned above that the enrollment may be a text-independent (TI) system or a text-dependent (TD) system. In other embodiments, the enrollment may have separate text-independent and text-dependent components. In that case, the speech samples provided for the text-independent and text-dependent components may be assessed separately using the method described above, to determine whether either or both of the speech samples is satisfactory, or whether the user should be prompted to generate additional speech samples in either case.

Several methods exist for performing the scoring between a section of speech and a trial voice print.

A first method of performing the scoring can be described as Direct Comparison. A new voice print is trained from the relevant section of the speech, and this new voice is then compared against the trial voice print.

For models employing an underlying Gaussian Mixture Model (GMM) like Joint Factor Analysis (JFA) or I-Vectors, the stacked vector of Gaussian means ('supervector') can be compared between the new voice print and the candidate voice print. Suitable norms for the comparison include: $L_2$ (sum-of-squares), RMS (root-of-mean-of-squares), Mahalanobis-distance (using the speaker-independent speech model's covariance).

A second method of performing the scoring can be described as Sub-space Comparison. Again, a new voice print is trained from the section of speech, and this new voice print is compared with the trial voice print. In subspace methods, the two voice print are projected into a lower-dimensional subspace and the comparison performed on the projections of their stacked supervectors. The cosine similarity, or scalar (dot) product may be used for comparing the projections. The projection itself can be learned during speaker-independent speech voice print training, like training the speaker-projection in JFA or the probabilistic linear discriminant analysis (PLDA) stage of typical I-Vector systems.

A third method of performing the scoring can be described as System Verification. The section of speech under test may be directly scored against the trial voice print by treating the section of speech as if it were a test utterance in a speaker verification system.

Independently of which method is chosen for performing the scoring, normalization (for example test-normalization (T-norm), F-ratio-normalization (F-norm), zero-normalization (Z-norm), or combinations, such as ZT-norm) may be applied to the comparison scores, using an additional set of non-target voice prints as a cohort. This may be necessary for scoring methods that do not fully compensate for predictable variability terms, like utterance length and phonetic content.

Possible metrics that can be used for assessing the distance between two probability distributions are:
Mahalanobis distance
ANOVA
Kullback-Leibler divergence
Bhattacharyya distance
Hellinger distance
Jensen-Shannon divergence
Fischer distance These techniques are used to derive a distance metric, because it is the position in the distribution that is more important than the absolute distance from a point/boundary.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of enrolling a user in a speaker recognition system, the method comprising:
receiving a sample of the user's speech;
dividing the sample of the user's speech into a plurality of sections;
generating a first trial voice print from a subset of the plurality of sections of the sample of the user's speech;
obtaining a score relating to the trial voice print;
generating a second voice print from all of the plurality of sections;
for each of the plurality of sections, obtaining a respective score representing a similarity between the respective section and the second voice print;
identifying one of said sections having the lowest similarity with the second voice print; and
enrolling the user on the basis of the trial voice print only if the score relating to the trial voice print meets a predetermined criterion, wherein the subset of the plurality of sections comprises the plurality of sections excluding the identified one of said sections.

2. A method according to claim 1, wherein obtaining the score relating to the trial voice print comprises:
obtaining the score, indicating a degree of similarity between the trial voice print and other voice prints or speech samples; and
enrolling the user on the basis of the trial voice print only if the score meets the predetermined criterion.

3. A method according to claim 2, wherein obtaining the score comprises obtaining a first score, indicating a degree of similarity between previously stored voice prints or speech samples of other speakers and the trial voice print, and wherein the method comprises:
enrolling the user on the basis of the trial voice print only if the first score is below a first threshold.

4. A method according to claim 3, wherein the first threshold corresponds to a predetermined false acceptance rate.

5. A method according to claim 3, comprising:
obtaining a plurality of scores, each of said scores indicating a respective degree of similarity between a respective previously stored voice print or speech sample of another speaker and the trial voice print;
determining which of the plurality of scores is a minimum; and
taking the minimum of the plurality of scores as the first score.

6. A method according to claim 2, comprising generating the trial voice print from at least one section of the sample of the user's speech,
wherein obtaining the score comprises obtaining a second score, indicating a degree of similarity between at least one other section of the sample of the user's speech and the trial voice print, and
wherein the method comprises:
enrolling the user on the basis of the trial voice print only if the second score is above a second threshold.

7. A method according to claim 6, wherein the second threshold corresponds to a predetermined false rejection rate.

8. A method according to claim 6, further comprising:
if the score does not exceed the second threshold, requesting the user to provide a second sample of their speech and generating a new trial voice print therefrom.

9. A method according to claim 6, further comprising:
if the score does not exceed the second threshold, generating a new trial voice print from the received sample of the user's speech.

10. A method according to claim 1, comprising:
obtaining a plurality of scores, each of said scores indicating a respective degree of similarity between a respective previously stored voice print or speech sample of another speaker and the trial voice print;
determining a mean of the plurality of scores; and
taking the mean of the plurality of scores as the first score.

11. A method according to claim 1, wherein the first score indicates a degree of similarity between previously stored voice prints or speech samples of a selected cohort of other speakers, and wherein the method comprises:
determining which of a plurality of cohorts of other speakers is closest to the trial voice print, and using said closest cohort as the selected cohort in obtaining the first score.

12. A method according to claim 1, comprising repeating the steps of obtaining a second voice print; obtaining a respective score representing a similarity between the respective section and the second voice print; and identifying the one of said sections having the lowest similarity with the second voice print, before obtaining the trial voice print.

13. A method according to claim 1, wherein the step of identifying the one of said sections comprises:
obtaining a plurality of second voice prints, each second voice print being based on the plurality of sections excluding a respective one of said sections;
for each of the plurality of sections, obtaining a respective score representing a similarity between the respective section and the respective second voice print based on the plurality of sections excluding that respective one of said sections;
identifying the one of said sections having the lowest similarity with the respective second voice print; and
using the second voice print based on the plurality of sections excluding the identified one of said sections as the trial voice print.

14. A method according to claim 1, wherein a score representing a similarity between speech and a voice print is obtained by:
training an utterance voice print from the speech; and
comparing the utterance voice print against said voice print.

15. A system for enrolling a user in a speaker recognition system, the system comprising an input for receiving a sample of the user's speech; and a processor, and the system being configured for:
 receiving the sample of the user's speech;
 dividing the sample of the user's speech into a plurality of sections;
 generating a first trial voice print from a subset of the plurality of sections of the sample of the user's speech;
 obtaining a score relating to the trial voice print;
 generating a second voice print from all of the plurality of sections;
 for each of the plurality of sections, obtaining a respective score representing a similarity between the respective section and the second voice print;
 identifying one of said sections having the lowest similarity with the second voice print; and
 enrolling the user on the basis of the trial voice print only if the score relating to the trial voice print meets a predetermined criterion, wherein the subset of the plurality of sections comprises the plurality of sections excluding the identified one of said sections.

16. A non-transitory computer readable storage medium having computer-executable instructions stored thereon that, when executed by processor circuitry, cause the processor circuitry to perform a method comprising:
 receiving a sample of the user's speech;
 dividing the sample of the user's speech into a plurality of sections;
 generating a first trial voice print from a subset of the plurality of sections of the sample of the user's speech;
 obtaining a score relating to the trial voice print;
 generating a second voice print from all of the plurality of sections;
 for each of the plurality of sections, obtaining a respective score representing a similarity between the respective section and the second voice print;
 identifying one of said sections having the lowest similarity with the second voice print; and
 enrolling the user on the basis of the trial voice print only if the score relating to the trial voice print meets a predetermined criterion, wherein the subset of the plurality of sections comprises the plurality of sections excluding the identified one of said sections.

\* \* \* \* \*